United States Patent [19]

Shatila et al.

[11] 3,968,265

[45] July 6, 1976

[54] FREEZE-THAW STABLE, FRENCH FRY POTATO PRODUCT AND PROCESS FOR PRODUCING THE SAME

[75] Inventors: Mounir A. Shatila; Roderick G. Beck, both of Blackfoot, Idaho

[73] Assignee: American Potato Company, Vacaville, Calif.

[22] Filed: Feb. 1, 1973

[21] Appl. No.: 328,536

[52] U.S. Cl. ............................... 426/550; 426/578; 426/637; 426/441; 426/444; 426/456; 426/524
[51] Int. Cl.² ........................................ A23L 1/10
[58] Field of Search ........... 426/342, 343, 346, 347, 426/438–441, 443, 444, 455–457, 472, 473, 524, 372, 637, 573, 578, 549, 550, 559, 560, 808, 100

[56] References Cited
UNITED STATES PATENTS

| | | | |
|---|---|---|---|
| 3,050,404 | 8/1962 | Traisman | 426/438 |
| 3,085,020 | 4/1963 | Backinger | 426/372 |
| 3,109,739 | 11/1963 | Hilton | 426/441 |
| 3,125,432 | 6/1964 | Keller | 426/441 |
| 3,136,643 | 6/1964 | Reeves | 426/456 |
| 3,220,857 | 11/1965 | Hollis | 426/372 |
| 3,230,094 | 1/1966 | Hilton | 426/441 |
| 3,282,704 | 11/1966 | Fritzberg | 426/550 |
| 3,399,062 | 8/1968 | Willard | 426/347 |
| 3,594,188 | 7/1971 | Huxsoll | 426/441 |
| 3,605,647 | 4/1969 | Beck | 425/168 |
| 3,649,305 | 3/1972 | Wilder | 426/444 |
| 3,764,716 | 10/1973 | Rainwater | 426/457 |

FOREIGN PATENTS OR APPLICATIONS

| | | |
|---|---|---|
| 985,808 | 3/1965 | United Kingdom |

*Primary Examiner*—Norman Yudkoff
*Assistant Examiner*—Martin G. Mullen
*Attorney, Agent, or Firm*—Kenyon & Kenyon Reilly Carr & Chapin

[57] ABSTRACT

A potato dough is prepared so that it is 23 to 40% solids including cooked intact potato cells, binder and raw starch, the remainder of the dough being moisture. The dough is divided into slabs and cut into strips of normal French fry potato size. The strips are then parfried in deep fat to a moisture content in the range of 40–65% to gelatinize the starch and form a matrix surrounding the intact potato cells throughout the piece, which matrix gels upon cooling, is not thereafter disturbed and makes the product freeze-thaw stable. The product is then frozen and stored. Without loss of piece integrity the product can be finish fried directly, or even after prolonged thawing, by deep fat frying or oven heating to form a crisp French fry.

24 Claims, No Drawings

FREEZE-THAW STABLE, FRENCH FRY POTATO PRODUCT AND PROCESS FOR PRODUCING THE SAME

BACKGROUND OF THE INVENTION

1. Field of the Invention

The invention relates to producing a dough, the solids of which comprise substantially potato solids; forming the dough to the piece size of standard French fry potatoes; parfrying the pieces, and freezing the parfried pieces to produce a product which can be heated (in oven or deep fat) from the thawed or frozen state to produce an excellent finished French fried potato.

2. Description of the Prior Art

Frozen parfried pieces of natural potato are by far the largest volume frozen vegetable product sold in the United States. Although these products are widely accepted, they have several recognized deficiencies. Natural potato pieces must be perfectly peeled and trimmed free of defects to prevent unacceptable dark areas on the finished pieces. French fries made from natural potato pieces vary greatly in size and shape due to the shape and dimensions of the tubers from which they are cut. Much of the original moisture of natural potato pieces remains after parfrying and freezing, and therefore, the finishing frying step takes too long, requiring about 3–5 minutes in oil heated to 350°–360°F. This is a distinct disadvantage in eating establishments which require rapid preparation of foods during rush periods. Further, although frozen French fried natural potatoes are quite good in texture when freshly fried, they quickly become limp and soggy when held after frying, even under heat lamps. Uniformity of color is also a problem since potatoes accumulate sugars during storage and, therefore, must be given additional processing to add or remove sugars to reach the optimum level.

To overcome these deficiencies, there have been attempts to prepare potato products, including French fries, at least in part from dehydrated potato particles such as potato flakes and potato granules.

The prior art discloses processes, such as English Pat. No. 608,996, for producing a dough from cooked, dried mashed potato powder (i.e. potato granules) and a small quantity of adhesive or binding agents which are soluble in or not incompatible with water, such as gums, pectins, gelatin or gelatinized starch. The solids are mixed with sufficient water to form the dough with approximately 33% solids and 67% moisture. The dough is then rolled and/or shaped into coherent pieces, such as chips and the like, and can be finish fried in one-half to one minute. U.S. Pat. No. 3,468,673 discloses a process for making French fry mix comprising approximately 95% dehydrated mashed potatoes (i.e. granules or flakes), 0.2 to 0.8% polygalactomannan gum, and 0.75 to 2% methyl cellulose. While the mixtures of the aforesaid patents may have been perfectly satisfactory for their intended purposes, they are completely unsatisfactory when parfried and frozen and then later refried for consumption. The freezing affects the texture adversely and results in a product which falls apart upon thawing.

U.S. Pat. No. 3,399,062 discloses a process for making frozen French fries. The patent discloses a process wherein dehydrated potato aggregates are rehydrated in 0.9 to 4.5 parts by weight water at a temperature below 130°F. in the presence of a thermal gelling cellulose ether binder. The rehydrated mix is extruded into French fry sized pieces and deep fat fried for final consumption. Alternatively the extruded pieces can be parfried after which they can be frozen and subsequently prepared for consumption by heating in a hot sack or baking in an oven. Such frozen products can be refried directly from the frozen state, or allowed to thaw before refrying. The patent states that the product remained firm after thawing, but the degree of firmness is not indicated. The patent also discloses the optional addition of raw potato pulp in the amount of 0–1.5% by weight of the potato solids in order to improve flavor. (The pulp would include a small amount of raw potato starch probably in the range of 0–0.3% of the solids). However, there is no disclosure of the use of 0.5 to 5% guar gum to impart structural strength during forming of the French fry pieces, nor, of 2–15% raw starch as the ingredient for imparting freeze-thaw strength following parfrying as in applicants' process. Also, applicants do not use a thermal gelling cellulose ether binder.

U.S. Pat. No. 3,634,105, commonly owned with the present application, discloses a process for making a hash brown potato product starting with a formulation similar to applicants' starting formulation. The patent discloses dry mixing approximately 91% (but not less than about 80%) by weight potato granules with 6–9% by weight raw starch and then adding water and mixing to form a dough having 17–50% solids and 50–83% moisture. Thereafter the dough is formed into potato pieces of the size of hash brown potatoes (i.e. ⅛ inch by ¼ inch in cross section and any convenient length) and then heat treated (as by steaming for 10 minutes on a screen) to gelatinize the starch. The partially dried strips are then finally dried to commercial dryness of 7½% moisture. The dehydrated hash browns readily rehydrate upon the addition of water without loss of piece integrity and can then be finally fried for eating and make a delicious dish of hash brown potatoes. The starting formulation does not include gum, as does applicants', and there is no disclosure of process steps to make freeze-thaw stable French fried potatoes.

U.S. Pat. No. 3,605,647, commonly owned with the present application, discloses process steps similar to applicants' process steps of forming French fried potato pieces from a potato dough. The patent discloses a dough is formed into French fry size strips by moving the dough through one set of parallel spaced apart wires to cause the dough to divide into portions and protrude outwardly from the wires while a second set of wires is synchronously moved transversely to the moving dough to separate the protruding portions into French fry size pieces. The potato pieces are then deep dried for eating. The patent does not disclose the preparation of freeze-thaw stable French fries, and, of course, applicants use a different formulation for preparing the dough and different processing steps prior to and after forming the French fry pieces.

American Potato Company has sold more than one year prior to the filing date of this application a French fry potato product that was made according to the following process steps:

a. a cohesive potato dough was prepared of about 33% solids and 66% moisture content, the solids at least including by weight about 96% intact cooked potato cells, about 2% gum binder and about 2% salt, the water being added to the dough at a temperature of about 70°;

b. the dough was formed into French fry size pieces by first dividing the dough into slabs and then crosscutting the slabs;
c. the pieces were then parfried in fat at a temperature of about 330°F. until the moisture content was reduced to about 56% by weight; and
d. the parfried pieces were then frozen, packaged and shipped to a final destination where they were thawed and finally finish fried in oil at about 350°F.

Raw starch was not used in any step of the process of making the product. In this instance the finished product was unsatisfactory. Most importantly, following parfrying, the potato pieces did not have sufficient piece integrity during each of the subsequent processing and handling steps. The parfried product was not freeze-thaw stable and had adverse flavor characteristics. Applicants overcome the deficiency of the aforesaid product due to the unique contribution of the addition of raw starch in proper amounts in the starting materials which renders applicants' product freeze-thaw stable and of excellent texture and flavor.

The product of the present invention does not suffer from the deficiencies of the prior art and is a freeze-thaw stable, parfried, French fry made from dehydrated potato particles and raw starch.

SUMMARY OF THE INVENTION

A cohesive potato dough of about 23–40% solids and 60–77% total moisture content is prepared by mixing starting materials the solids of which comprise by weight 85–95% intact cooked potato cells, 0.5–5% gum binder and 2–15% extracellular raw starch, the water being added at a temperature of 45°–200°F. in an amount equal to about 1.5 to 3.2 times the weight of the solid matter present. The dough is then formed into French fry size pieces by advancing the dough through one set of wires to divide the dough into portions while synchronously cutting the divided portions into French fry size pieces by moving a second set of wires across the path of the advancing dough. The formed pieces are then parfried in oil to produce a firm parfried piece of about 40–65% moisture content in which the extracellular raw starch is gelatinized and has formed a starch matrix surrounding the intact potato cells throughout the potato piece which matrix, upon cooling, forms a firm gel and renders the potato piece freeze-thaw stable. The parfried pieces are then frozen and stored and are thereafter prepared for consumption directly, or after thawing, without loss of piece integrity by finish frying in deep fat for 1–2 minutes at 340°F. or by oven baking for 10 minutes at 400°–450°F. to form a crisp French fry.

It is an object of this invention to produce a parfried French fry potato product which is freeze-thaw stable and can be frozen and stored for extended periods of time and then thawed without loss of its structural strength.

It is an object of this invention to produce a parfried French fry potato product that can be quickly finish fried in one to two minutes and can then be stored under heat lamps for extended periods of time and still remain crisp and tasty.

It is an object of this invention to produce parfried French fry potato pieces that are free of skin particles and defective portions and are uniform in size, color and sugar content.

It is an object of this invention to produce a parfried French fry potato product that has improved moisture content and oil content characteristics after finish frying, and which produces a greater yield after finish frying.

It is a further object of this invention to provide a process that is adaptable to fabricating the parfried potato pieces from either dehydrated mashed potatoes, freshly cooked potatoes or both.

Further objects will appear in the following description and examples.

DESCRIPTION OF THE PREFERRED EMBODIMENTS

A successful parfried frozen potato must have several characteristics. Primarily, it must have the structural strength to maintain piece integrity during all the processing steps especially after thawing, prior to refrying, as well as during refrying. The piece must not be excessively oily after final frying. Lastly, the piece must be crisp and tender when consumed, even after holding under a heat lamp.

A dry uniform mix of solids of starting materials is prepared including by weight 85 to 95% essentially intact cooked potato cells such as potato flakes or potato granules, 0.5–5% of a binder such as guar gum, and 2–15% extracellular raw starch such as potato, wheat, rice, arrowroot, corn or tapioca. Water at a temperature of 45° to 200°F. is then added in an amount equal to 1.5 to 3.2 times the weight of the solid matter present and mixed to form a uniform potato dough. The final dough has a solids content in the range 23–40% and a moisture content in the range 60–77%. The dough can be produced continuously by adding the ingredients continuously to a mixer and collecting the discharge dough for continuous formation into French fry size pieces.

The preferred apparatus for forming the dough into pieces is described in detail in U.S. Pat. No. 3,605,647. In brief, the dough is advanced in a container by a driving means through a grid of wires of either straight or crinkled configuration spaced apart by the width of the desired French fry which is usually in the range of ¼ inch to ⅜ inch, but can be larger or smaller. When the dough has advanced through the wires by the same distance as the grid spacing, the protruding portions, or dough slabs, are cut off by a second moving wire to produce a firm fabricated piece of dough formed with a square cross section and a length corresponding to the length of the openings in the wire grid — usually about 2 to 4 inches.

The fabricated pieces are then parfried in oil for about 20 to 120 seconds at an oil temperature of about 300°–370°F. to produce a firm parfried piece of about 40–65% moisture content and 5 to 20% oil content.

The parfried pieces are allowed to cool and are then frozen. The latter two steps may be either separate or combined processing steps. The frozen parfried pieces are then distributed in that form to eating establishments or to housewives who can prepare them for consumption directly, or after thawing, either by frying in deep fat for about 1 to 2 minutes at a temperature of about 340°F. or by heating in an oven for 10 minutes at 400°–450°F. The finished product has a moisture content of about 35–50% and an oil content of about 12 to 22%.

The potato solids used in producing the dough must be essentially cooked intact potato cells to duplicate the texture and mouth feel of a natural potato piece which has essentially intact cells. The minor starch and binder constituents of the dough seem to function as a replacement for the binding between the intact cells of a piece of natural cooked potato. The preferred process uses as the sources of intact cooked potato cells solely dehydrated instant mashed potatoes including potato granules, potato flakes and potato agglomerates. We have also successfully used freshly cooked potatoes as a prominent source of intact cells. In the latter case, a debris-free, damage-free, cooked potato slurry of about 17% solids is produced by preparing potatoes by peeling and trimming, cooking the prepared potatoes, and then slurrying with water and removing the debris. The solids level is then best adjusted to the desired 23–40% range by the incorporation of dehydrated instant mashed potato products, such as potato flakes, potato granules or potato agglomerates.

Guar gum, or equivalent binder, such as locust bean gum and sodium alginate-calcium chloride was found to be necessary to provide sufficient cohesiveness to allow formation of distinct pieces which would retain their piece integrity prior to, and during, the first part of parfrying. Successful formulations contained 0.5–5% gum in the solids. Gum in excess of 5% of the solids gave no added advantages and imparted an undesirable texture.

The extracellular raw starch ingredient of the dough serves multiple functions and is an ingredient of primary importance for the production of products of optimum characteristics. In the production of the dough itself, the presence of starch serves a minor function since raw starch has very little cohesiveness or water holding ability. In the dough formation, the gum binder furnishes the cohesiveness required so that the dough can be divided into desired shapes without losing piece integrity. However, after dough formation and during the parfrying step, the extracellular raw starch swells and gelatinizes, thereby binding the water present into a firm gel which is not disturbed thereafter. When formulations without raw starch or with an equivalent amount of pregelatinized starch of the same kind is used in making the dough, the end products become gummy in texture, do not have the required structural strength to withstand subsequent handling and are not freeze-thaw stable. It appears that extracellular raw starch, uniformly distributed throughout the dough, must be gelatinized after piece formation to produce, after cooling, a gelled starch matrix which results in a firm piece, even after freezing and prolonged thawing. Although raw potato starch and corn starch are preferred, other raw starches, such as tapioca, wheat, rice and arrowroot are also effective. Although the percentage of raw starch required varied with the source of potato solids and the intensity of dough mixing, successful product was made with as little as 2% of the dough solids as raw starch. There were no added advantages of using more than 15% starch. Higher raw starch levels resulted in dry end products with excessive toughness or gumminess.

When raw ground potato was used as the source or raw starch, the end product had the desired physical characteristics, but the added potato flavor was generally judged undesirable. Fractions isolated from raw starch, such as the raw amylose fraction of corn starch, were also used successfully — the only disadvantage being a higher ingredient cost.

Optional ingredients, such as salt, sucrose, dextrose, flavor enhancers, vitamins, and coloring agents can also be incorporated into the dough to give the desired flavor and color. The percentages by weight of the solids of these optional ingredients are usually in the range of 0–3%. These optional ingredients are not a part of the invention and have been disclosed in the prior art. The salt in the dough provides a uniformity superior to salting the surfaces after frying. Sucrose may be added to adjust the sweetness level to the desired point. Dextrose or corn syrup may be added if a darker color is also desired.

The ability to use water at a wide temperature range in forming the dough is essential because of wide differences in the characteristics of dehydrated instant mashed potato products, such as potato flakes and potato granules, even though they are all essentially intact potato cells. For example, if more oil pickup is desired, the temperature and amount of the water used is increased. For less oil pickup, the temperature and amount of water is decreased. If rehydration must be done within a specified temperature range, as required in some prior art processes, optimum end products cannot be produced from either potato flakes or potato granules or any other suitable intact potato cell products available.

Since the lack of freeze-thaw strength was the critical weakness of similar prior art products, it was necessary to develop an objective measurement of piece strength after freezing, thawing and standing at room temperature for several hours. The preferred test requires (1) taking 20 pieces which have been parfried, frozen and then thawed for 6 hours, (2) freely tumbling them in an enclosed container for 10 minutes and (3) recording the number of intact pieces after tumbling. If the tumbling test shows five or more intact pieces, the product is judged acceptable for commercial frozen distribution.

The manner by which the pieces are formed has an effect on the final appearance and physical characteristics of the piece after frying. When forming is done exclusively by wire cutting, as described above, all four major surfaces of each piece have an uncompressed porous surface which allows ready escape of water vapor from within during frying, thereby allowing retention of the formed shape. When forming is done by extrusion, the inherent pressure seems to seal the surfaces, thereby impeding the escape of water vapor during frying, sometimes resulting in blistering or other piece deformation. Any such distortion detracts from a natural cut potato look.

Parfrying was found to be essential to the production of the product of the invention. The normal parfrying temperature of about 300°–370°F. is sufficient to increase the product temperature to a point where the extracellular raw starch present gelatinizes to form a matrix which binds water in the dough and forms, upon cooling, a firm undisturbed gel which imparts required structural rigidity after thawing. The formation of an outer crust also results from parfrying and helps to provide structural strength, but in itself is not sufficient without the freshly gelatinized starch gel matrix. The parfry temperature, of course, must be high enough to increase the temperature of the piece center above the gelatinization point of the raw starch. Also, during parfrying, some dehydration occurs due to moisture loss. If parfrying is terminated before the moisture content is reduced to about 65% or lower, the resulting piece has unacceptable fragility. If parfrying is continued until the moisture content is 45% or below, the resulting refry tends to be excessively tough and leathery. The parfried pieces are substantially lower in moisture content then parfried natural potato pieces, thereby resulting in a much shorter required refrying time, as well as a much higher yield of finished product per weight unit of parfried pieces. Furthermore, excessive oiliness is avoided by the proper selection of dough ingredients and the extent of rehydration.

The freezing and storage of the parfried pieces is conventional. After draining, the parfried pieces are further cooled and frozen by being exposed to a cold air blast for a short time interval, such as an air blast at 0° to −20°F. for about 10–15 minutes, followed by packaging and storage below 0°F.

The product of the invention can be refried from the frozen state, or allowed to thaw before refrying, without loss of piece integrity or quality of the finished fry.

EXAMPLE 1

Deep Fat Fry Finish

A dry uniform mix of the following composition was prepared:

| | Percentage by Weight |
|---|---|
| Potato granules (2.5% reducing sugars) | 90.0% |
| Raw potato starch | 7.0% |
| Guar gum (F6 — sold by General Mills, Inc.) | 1.5% |
| Salt | 1.5% |
| | 100.0% |

The above formulation was continuously metered into the inlet end of a horizontal mixer equipped with paddles around a horizontal shaft. Simultaneously 2.26 parts by weight of water at 140°F. ± 2°F. was metered with the dry material to form a uniform dough of about 71% moisture content. The discharged dough was advanced continuously downward by means of a helical screw in a vertical container, the bottom of which was open and spanned by parallel wires spaced 5/16 inches apart. The protruding slabs formed by the dough passing through the wire grid contacted a sensing element which activated a wire which moved transversely to the path of the dough and severed the protrusions into French fry shapes of square cross section and about 4 inches in length. The formed pieces discharged into a continuous deep fat fryer operated at 340°F. and with a residence time of about 35 seconds. The parfried pieces had a moisture content of 56.0% and an oil content of 6.0%. The pieces were then discharged on an inclined draining belt which in turn discharged the drained pieces in a single layer depth into a blast freezer at an air temperature of −10°F. and a residence time of 15 minutes. The individual frozen pieces were packaged in wax coated cartons at 4 lbs./carton. Six cartons were combined in a shipping container and stored at 0° to −10°F. After about 24 hours frozen storage, a representative frozen sample was allowed to thaw and stand at room temperature for 6 hours. A second frozen sample was refrigerated at 40°F. for 7 days (this sample thawed after a short time). Twenty pieces of each sample were then tumbled for 10 minutes in a rotating container, after which treatment the number of unbroken intact pieces remaining was 19 from the thawed room temperature sample, and 15 from the refrigerated sample.

In another series of tests a dramatic advantage of the product of the present invention as compared to the standard frozen commercial product was demonstrated when the oil content was measured for two samples of each which were finish fried, one directly after frozen storage and, the other after storage for 1 week at a temperature between 35°–40°F. The oil content of the product of the invention fried directly from frozen storage was 12.0% and, for the refrigerated sample 13.2%. In the case of standard commercial French fries, the oil content of the sample finish fried direct from the frozen state was 11.0% and for the refrigerated sample, 27.6%. The higher oil content for commercial French fries is significant because many food establishments have only refrigerated storage, and an oil content in excess of 20% is generally considered completely unacceptable.

Another portion of the frozen parfries was finish fried in oil at 350°F. for 60 seconds. The yield of finished product was found to be 88% of the parfried weight. The moisture of the finished product was 45%, and the oil content was 13.0%. In contrast, conventional frozen French fries usually yield only about 65 to 75% of the parfry weight and have an oil content of about 10–15%. The product was golden brown in color with a crisp bite and excellent texture and flavor. A portion of the finished product was held under a standard restaurant heat lamp for 15 minutes. The held product was still crisp in contrast to a sample of conventional frozen French fries which became decidedly limp and soggy after only 5 minutes under the heat lamp.

If a more tender product is desired, the amount of reconstitution water can be increased.

EXAMPLE II

Oven Bake Finish

A dry uniform mix of the following composition was prepared:

| | Percentage by Weight |
|---|---|
| Potato granules (2.5% reducing sugar) | 92.5% |
| Potato starch | 5.0% |
| Guar gum (F6 — sold by General Mills, Inc.) | 1.0% |
| Salt | 1.5% |
| | 100.0% |

Using the procedure of the previous embodiment, a uniform dough of 73% moisture content was produced using 2.4 parts by weight of water at 145°F. to 1 part by weight of the above dry mix. Dough pieces were formed as before and parfried in deep fat at 330°F. for 100 seconds. The parfried pieces had a moisture content of 48% and an oil content of 16%. The pieces were drained, frozen, packaged and stored as before at 0° to −10°F. The stored pieces were prepared for consumption by placing in an oven preheated to 450°F. for 10 minutes. The yield after baking was 81%. The finished product had a moisture content of 38% and contained 18% oil.

What is claimed is:

1. The process of fabricating potato pieces suitable for freezing and which remain freeze-thaw stable prior to refrying, comprising the steps of:
   a. preparing a cohesive dough of about 23–40% solids and 60–77% moisture content by mixing together the following ingredients,
      i. a source of intact cooked potato cells,
      ii. gum binder,
      iii. extracellular raw starch, and iv. water, the solids comprising by weight 85–95% of said source of intact cooked potato cells, 0.5–5% of said gum binder and 2–15% of said extracellular raw starch, the water being added at a temperature of 45°–200°F., b. forming the dough into French fry pieces c. parfrying the pieces in fat at a temperature of about 300°–370°F., said parfrying step, gelatinizing said extracellular raw starch, said parfrying taking place until the moisture content of the pieces is about 40–65% by weight d. cooling down the parfried pieces such that said gelatinized extracellular raw starch forms a firm, gel starch matrix throughout the pieces, said gel matrix binding the water remaining in said pieces, and e. freezing the parfried peices, said binding of the water by said gel matrix resulting in said pieces having structural rigidity after complete thawing thereof, even at room temperature, prior to refrying and serving.

2. The process of claim 1 wherein the cooling and freezing steps are accomplished by exposing the pieces to a blast of air at a temperature below freezing.

3. The process of claim 1 wherein the forming step comprises dividing the dough into slabs of French fry thickness and then separating the slabs to form French fry size pieces.

4. The process of claim 3 in which the dividing step is accomplished by advancing the dough through a grid of parallel wires spaced apart about ¼ to ⅜ inches and the separating step is accomplished by at least one moving wire to produce pieces with a square cross section.

5. The process of claim 1 in which the intact cooked potato cells are at least partly from freshly cooked potatoes and the natural moisture of the freshly cooked potatoes comprises at least part of the water in the cohesive dough.

6. The process of claim 1 in which the intact cooked potato cells are at least partly dehydrated instant mashed potato products.

7. The process as recited in claim 1 in which the intact cooked potato cells are dehydrated instant mashed potato products selected from the group consisting of potato granules, potato flakes, and potato agglomerates.

8. The process of claim 1 in which said water is 1.5 to 3.2 times the weight of the solids.

9. The process of claim 8 in which the water is being added at a temperature of about 140°F. and is about 2.26 times the weight of the solids.

10. The process of claim 9 in which the gum binder is guar gum present in the concentration of about 1.5% by weight and the extracellular raw starch is potato starch present in the concentration of about 7% by weight.

11. The process of claim 1 further comprising the steps of finish frying the pieces for about 60 seconds in oil at about 350°F. to produce a finished French fried potato piece for consumption.

12. The process of claim 11 in which said frozen pieces are allowed to thaw completely prior to the finish frying.

13. The process of claim 1 in which the gum binder is guar gum present in the concentration of about 1.0% by weight, and the extracellular starch is potato starch present in the concentration of about 5%.

14. The process of claim 13 in which the water is being added at a temperature of about 140°F. and is present in a ratio of about 2.4 times the weight of the solids.

15. The process of claim 14 in which the frozen pieces are baked for about 10 minutes at about 450°F.

16. The process of claim 1 in which the cohesive dough solids comprise additionally by weight 0–3% salt, 0–3% sucrose, and 0–3% dextrose.

17. The process of making potato pieces comprising the steps of:

a. preparing potatoes by peeling and trimming, b. cooking the prepared potatoes, c. slurrying the cooked potatoes with water to produce a damage-free slurry of about 17% solids, d. removing debris from the damage-free slurry, e. thickening the debris-free, damage-free slurry to a dough with a solids content in the range of 23–40% by weight by addition of dehydrated instant mashed potato product, raw starch and gum binder, the solids of the dough comprising by weight 85–95% intact cooked potato cells, 0.5–5% gum binder, 2–15% raw starch, f. forming French fry pieces from the dough, g. parfrying the formed pieces in hot fat until the moisture content is reduced below about 65% by weight and the raw starch is gelatinized throughout the pieces, h. allowing the pieces to cool to form a firm starch gel matrix, said gel matrix binding the water remaining in said pieces, and i. freezing the parfried pieces, said binding of the water by said gel matrix resulting in said pieces having structural rigidity after complete thawing thereof, even at room temperature, prior to refrying and serving.

18. The process of claim 17 wherein the allowing the parfried pieces to cool and freezing steps are accomplished by exposing the pieces to a blast of air at a temperature below freezing.

19. The process of claim 17 wherein the gum binder is guar gum and is present in a concentration of about 1.5% by weight and the raw starch is potato starch and is present in the concentration of about 7% by weight.

20. The process of claim 17 wherein said frozen parfried pieces are additionally refried to produce finished French fried potato pieces with a mixture content of about 45% and an oil content of about 13.0%.

21. Frozen, parfried potato dough pieces suitable for refrying to produce French fry potato pieces wherein each of said piece comprise throughout a plurality of intact cooked potato cells surrounded by a gelatinized starch gel matrix, provided by 2–15% extracellular raw starch by weight of the oil free solids prior to parfrying, and a gum binder, said extracellular raw starch gelatinizing when said pieces are parfried and forming said starch gel matrix when subsequently cooled, said starch gel matrix binding the water remaining in said pieces after parfrying and imparting structural strength sufficient to substantially retain piece integrity when fried or oven heated directly or even after complete thawing at room temperature.

22. The product of claim 21 further comprising by weight of the parfried piece a moisture content in the range of 35–65% and an oil content of 5–22%.

23. The product of claim 21 having a square cross section in the range of ¼–⅜ inch and a length of about 2–4 inches.

24. The product of claim 21 wherein the oil free solids content of the parfried pieces is derived from, prior to parfrying in oil, the solids content of a potato dough which includes by weight of the dough solids
   a. 85–95% intact cooked potato cells selected from the group consisting of freshly cooked potatoes and dehydrated instant mashed potatoes,
   b. 2–15% extracellular raw starch uniformly distributed throughout the dough and selected from the group consisting of potato, wheat, rice, arrowroot, corn and tapioca, and
   c. 0.5–5% gum binder.

* * * * *

UNITED STATES PATENT AND TRADEMARK OFFICE
CERTIFICATE OF CORRECTION

PATENT NO. : 3,968,265
DATED : July 6, 1976
INVENTOR(S) : Mounir A. Shatila; Roderick G. Beck It is certified that error appears in the above-identified patent and that said Letters Patent are hereby corrected as shown below:

Col. 2, Line 22 - "3,,634,105" should be --3,634,105--.

Line 53 - "dried" should be --fried--.

Col. 10, Line 51 - "piece" should be --pieces--.

Signed and Sealed this

Nineteenth Day of October 1976

[SEAL]

Attest:

RUTH C. MASON
*Attesting Officer*

C. MARSHALL DANN
*Commissioner of Patents and Trademarks*